(12) United States Patent
Hayashi et al.

(10) Patent No.: US 11,671,464 B2
(45) Date of Patent: Jun. 6, 2023

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Manabu Hayashi, Kanagawa (JP); Tomoaki Hirano, Kanagawa (JP); Rie Muraishi, Kanagawa (JP); Tatsuo Mishima, Kanagawa (JP); Tomonori Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 216 days.

(21) Appl. No.: 16/547,592

(22) Filed: Aug. 22, 2019

(65) Prior Publication Data
US 2020/0314150 A1  Oct. 1, 2020

(30) Foreign Application Priority Data
Mar. 25, 2019 (JP) .............................. JP2019-055945

(51) Int. Cl.
*H04L 9/40* (2022.01)
*H04L 67/146* (2022.01)
*H04L 67/104* (2022.01)

(52) U.S. Cl.
CPC .......... *H04L 63/30* (2013.01); *H04L 63/0428* (2013.01); *H04L 63/0823* (2013.01); *H04L 63/102* (2013.01); *H04L 67/1044* (2013.01); *H04L 67/146* (2013.01)

(58) Field of Classification Search
CPC ............. H04L 63/0428; H04L 63/0823; H04L 63/102; H04L 63/30; H04L 67/1044; H04L 67/146
See application file for complete search history.

(56) References Cited

U.S. PATENT DOCUMENTS

| 9,338,008 | B1* | 5/2016 | Kirkland | .................. H04L 9/083 |
| 2007/0203776 | A1* | 8/2007 | Austin | ............... G06Q 10/1053 705/321 |
| 2008/0239365 | A1* | 10/2008 | Salgado | ................ G06F 3/1284 358/1.15 |
| 2010/0027054 | A1* | 2/2010 | Reddy | ............... H04N 1/00244 358/1.15 |

(Continued)

FOREIGN PATENT DOCUMENTS

| JP | 2002245043 | 8/2002 |
| JP | 2004199409 | 7/2004 |

(Continued)

OTHER PUBLICATIONS

"Office Action of Japan Counterpart Application" with English translation thereof, dated Jan. 10, 2023, p. 1-p. 6.

*Primary Examiner* — Thomas J Dailey
(74) *Attorney, Agent, or Firm* — JCIPRNET (57) ABSTRACT

An information processing apparatus managed by an administrator and used by plural users includes a reception unit and a request unit. The reception unit receives a disclosure request from the administrator related to secret information in a job processed by the information processing apparatus. The request unit requests a disclosure of the secret information with respect to a user of a target job that is a target of the disclosure request.

10 Claims, 10 Drawing Sheets

(56) References Cited

U.S. PATENT DOCUMENTS

| | | | |
|---|---|---|---|
| 2010/0082652 A1* | 4/2010 | Jones | G06Q 30/02 |
| | | | 707/758 |
| 2014/0165167 A1* | 6/2014 | Nunn | G06F 21/335 |
| | | | 726/6 |
| 2019/0311147 A1* | 10/2019 | Gollogly | H04L 63/105 |

FOREIGN PATENT DOCUMENTS

| | | |
|---|---|---|
| JP | 2006344126 | 12/2006 |
| JP | 2015207043 | 11/2015 |

* cited by examiner

| USER A | JOB CONFIRMATION SCREEN | |
|---|---|---|
| (TYPE) | (DESTINATION/CONTENT) | (STATUS) |
| REPORT | — | NORMAL END |
| EMAIL TRANSMISSION | ABC@xxx.co.jp | ABNORMAL END |
| COPY | — | NORMAL END |
| PRINT | Product_Specs.doc | ABNORMAL END |

FIG. 3B

| ADMINISTRATOR | JOB CONFIRMATION SCREEN | |
|---|---|---|
| (TYPE) | (DESTINATION/CONTENT) | (STATUS) |
| REPORT | — | NORMAL END |
| EMAIL TRANSMISSION | * * * * * * | ABNORMAL END |
| COPY | — | NORMAL END |
| PRINT | * * * * * * | ABNORMAL END |

```
ADMINISTRATOR         JOB CONFIRMATION SCREEN
┌─────────────────────────────────────────────────┐
│  EMAIL TRANSMISSION                    [ × ]    │
│                                                 │
│  USER NAME: * * * * *                           │
│  ADDRESS: * * * * * * *                         │
│  EXECUTION RESULT: FORWARDING ERROR (016-503)   │
│  END TIME: 03/07/2019  17:52                    │
│  READING SIZE: A4                               │
│                                                 │
│         [ SEND DISCLOSURE REQUEST ]             │
└─────────────────────────────────────────────────┘
```

FIG. 6B

```
ADMINISTRATOR         JOB CONFIRMATION SCREEN
┌─────────────────────────────────────────────────┐
│ SELECT ITEMS TO DISCLOSE (EMAIL TRANSMISSION) [×]│
│                                                 │
│       [ ✓ ]  [ USER NAME ]                      │
│                                                 │
│       [ ✓ ]  [ ADDRESS ]                        │
│                                                 │
│         [ SEND DISCLOSURE REQUEST ]             │
└─────────────────────────────────────────────────┘
```

| USER A | JOB INFORMATION DISCLOSURE |

PERIOD OF INFORMATION DISCLOSURE

12/17/2018 9:00 — 12/17/2018 10:13

INFORMATION ABOUT JOBS IN THE ABOVE PERIOD WILL BE DISCLOSED.

[DISCLOSE]  [CANCEL]

FIG. 9B

| ADMINISTRATOR | JOB INFORMATION DISCLOSURE |

PERIOD OF INFORMATION DISCLOSURE

12/17/2018 9:00 — 12/17/2018 10:13

THE DISCLOSURE OF INFORMATION ABOUT JOBS IN THE ABOVE PERIOD WILL BE REQUESTED.

[SEND DISCLOSURE REQUEST]  [CANCEL]

FIG. 10

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-055945 filed Mar. 25, 2019.

BACKGROUND

(i) Technical Field

The present disclosure relates to an information processing apparatus and a non-transitory computer readable medium.

(ii) Related Art

Japanese Unexamined Patent Application Publication No. 2004-199409 describes a job processing apparatus that stores an attribute item related to the privacy of a user from among attribute items included in the attribute information of a job, and in the case in which a condition is satisfied, such as a condition that the user who issued the job is a secret user or a condition that an attribute item of the job indicates confidentiality with a confidential level equal to or greater than a threshold value, the job processing apparatus conceals an attribute item related to the privacy of the job.

Also, Japanese Unexamined Patent Application Publication No. 2006-344126 describes a job information display apparatus that holds information indicating a secret item from among job information containing multiple items, and in a case in which a user having special rights logs in via user authentication, the job information display apparatus causes the secret item not to be hidden.

Additionally, Japanese Unexamined Patent Application Publication No. 2015-207043 describes an information processing apparatus that stores a content attribute for every history element forming history information, manages a disclosability that grants a permission, a conditional permission, or a denied permission to reveal history elements to a user, and presents the history information according to the managed disclosability.

SUMMARY

Although the technologies described above are known, in recent years, services are appearing in which information processing apparatus are placed in public spaces such as shared offices, for example, and users who sign a usage agreement utilize the information processing apparatus.

In such services, for example, if an administrator who manages the information processing apparatus and a user who uses the information processing apparatus belong to mutually different organizations such as corporations, from the user's perspective, it may be desirable to conceal information related to a job processed by the information processing apparatus to limit disclosure to the administrator of the information processing apparatus in some cases. On the other hand, from the administrator's perspective, in the case where some kind of malfunction occurs due to processing a user's job on an information processing apparatus managed by the administrator oneself, if information related to the job is concealed, a situation in which the administrator is unable to investigate the cause of the malfunction thoroughly could conceivably occur.

Aspects of non-limiting embodiments of the present disclosure relate to making it possible to request the disclosure of secret information according to a disclosure request from an administrator with respect to a user of a target job that is the target of the disclosure request.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus managed by an administrator and used by a plurality of users, including a reception unit that receives a disclosure request from the administrator related to secret information in a job processed by the information processing apparatus, and a request unit that requests a disclosure of the secret information with respect to a user of a target job that is a target of the disclosure request.

BRIEF DESCRIPTION OF THE DRAWINGS

An exemplary embodiment of the present disclosure will be described in detail based on the following figures, wherein.

DETAILED DESCRIPTION

Figure 1:
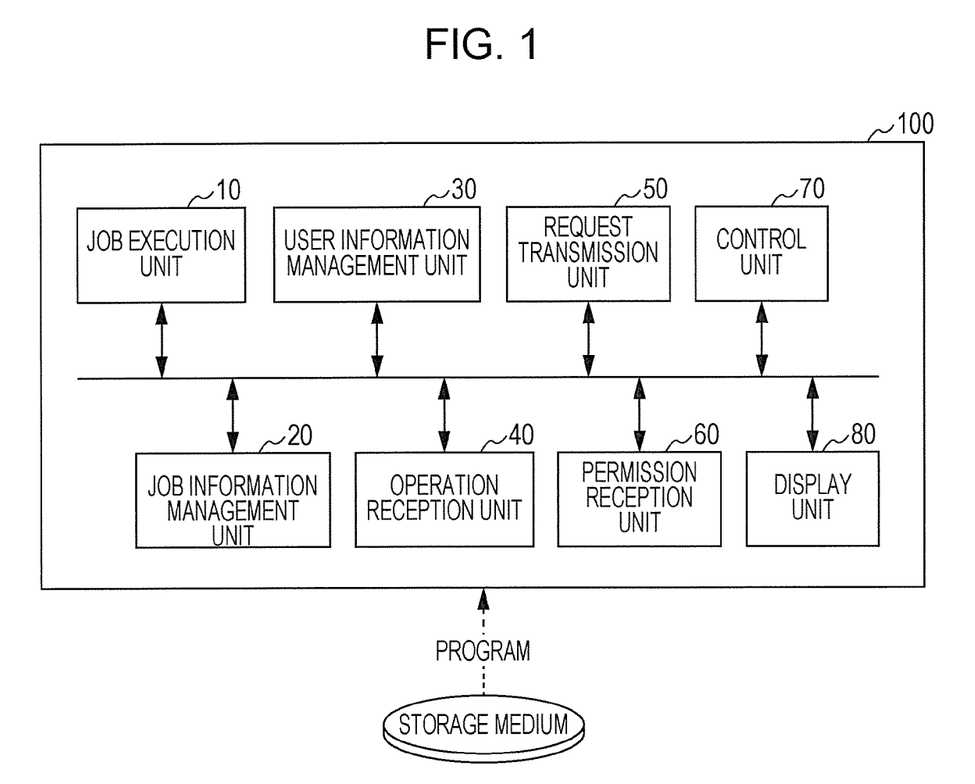
FIG. 1 is a diagram illustrating a specific example of an information processing apparatus.

FIG. 1 is a diagram illustrating one example of a specific exemplary embodiment of the present disclosure. In FIG. 1, a specific example of an information processing apparatus 100 is illustrated. In the specific example illustrated in FIG. 1, the information processing apparatus 100 is provided with a job execution unit 10, a job information management unit 20, a user information management unit 30, an operation reception unit 40, a request transmission unit 50, a permission reception unit 60, a control unit 70, and a display unit 80.

The job execution unit 10 is provided with a function of executing jobs. A job is a unit of information processing executed by the information processing apparatus 100. Specific examples of jobs include image processing such as printing, copying, and scanning, and communication processing such as email transmission, for example. The job execution unit 10 executes a job specified by an instruction from a user who uses the information processing apparatus 100, for example.

Note that the user may issue an instruction to execute a job through an operation on the operation reception unit 40 described later, or issue an instruction to execute a job from a user apparatus (such as a personal computer, a tablet, or a mobile phone) connected to the information processing apparatus 100 through a communication channel or the like, for example.

The job information management unit 20 stores and manages information related to jobs to be executed by the job execution unit 10. For example, the job information management unit 20 manages a job list, job information, a secrecy setting, and the like as the information related to jobs.

The job list is information indicating a list of one or more jobs executed by the job execution unit 10. The job information is job-related information associated with every job. Specific examples of job information include attribute information such as a user name (the user name of a job owner who issued an instruction to execute the job), a department name (such as a department to which the job owner belongs), a job type, a destination, an execution time (the date and time when the job was executed), and an execution result. The secrecy setting is a setting regarding whether or not job-related information is to be kept secret. For example, the job owner who issues the instruction to execute the job may set the secrecy setting in addition to issuing the job execution instruction.

The user information management unit 30 stores and manages user information related users who use the information processing apparatus 100. For example, the user information includes a contact address and the like of users who have signed a usage agreement for the information processing apparatus 100. Note that the user information may also be managed by a management server connected to the information processing apparatus 100 via a communication channel or the like, for example. In the case in which the user information is managed by a management server, the information processing apparatus 100 may acquire user information from the management server as appropriate.

The operation reception unit 40 is provided with a function of receiving operations from a user or the like who uses the information processing apparatus 100. For example, the user may perform an operation on the operation reception unit 40 and thereby issue an instruction to execute a job or set the secrecy setting. In addition, the operation reception unit 40 may also receive a disclosure request operation related to secret information from an administrator of the information processing apparatus 100, and receive a disclosure permission operation related to secret information from a job owner. Note that specific examples of the disclosure request and disclosure permission of the secrecy setting will be described later.

The request transmission unit 50 transmits disclosure request information of the secrecy setting. Also, the permission reception unit 60 receives a disclosure permission response related to the secrecy setting. Specific examples related to the disclosure request information and the disclosure permission response will be described later.

The control unit 70 centrally controls the information processing apparatus 100 exemplified in FIG. 1 as a whole. The control unit 70 executes control in accordance with various programs, for example. For example, the control unit 70 may be realized using a computational processing device such as a CPU or a processor.

The display unit 80 displays display images such as user interface images with respect to a user, an administrator, or the like who uses the information processing apparatus 100 exemplified in FIG. 1, for example. The display unit 80 may be realized using a display device such as a liquid crystal display or an organic electroluminescence (EL) display, for example. Note that the functions of the operation reception unit 40 and the display unit 80 may also be realized by a display device provided with touch panel functions, for example.

Also, the information processing apparatus 100 exemplified in FIG. 1 may be realized using one or more computers, for example. The one or more computers are provided with hardware resources, including a computational device such as a CPU, a storage device such as memory and a hard disk, a communication device that uses a communication channel such as the Internet, a device that reads data from a storage medium such as an optical disc, semiconductor memory, or card memory and also writes data to the storage medium, a display device such as a display, and an operation device that receives operations from a user.

Additionally, for example, a program (software) corresponding to at least a portion of the functions from among the multiple labeled portions provided in the information processing apparatus 100 of the specific example illustrated in FIG. 1 may be loaded into a computer, and through the cooperative action of the hardware resources provided in the computer and the loaded software, at least a portion of the functions of the information processing apparatus 100 exemplified in FIG. 1 may be realized by the computer. The program may be provided to the computer (information processing apparatus 100) via a communication channel such as the Internet, or may be provided to the computer (information processing apparatus 100) by being stored on a storage medium such as an optical disc, semiconductor memory, or card memory, for example.

Additionally, an image processing apparatus provided with the functions of the information processing apparatus 100 exemplified in FIG. 1 may also be realized. For example, the image processing apparatus may be a multifunction apparatus provided with multiple image output functions (at least several functions from among a print function, a scan function, a copy function, a facsimile function, and the like). For example, if the image processing apparatus provided with the functions of the information processing apparatus 100 exemplified in FIG. 1 is a multifunction apparatus, the image processing apparatus may be placed in a place of provision such as a store and used by users who have signed a usage agreement.

The overall configuration of the information processing apparatus 100 exemplified in FIG. 1 is as described above. Next, specific examples of processes and the like realized by the information processing apparatus 100 of FIG. 1 will be described in detail. Note that in the following description, the signs given in FIG. 1 will be used to refer to the configuration (portions) illustrated in FIG. 1.

Figure 2:
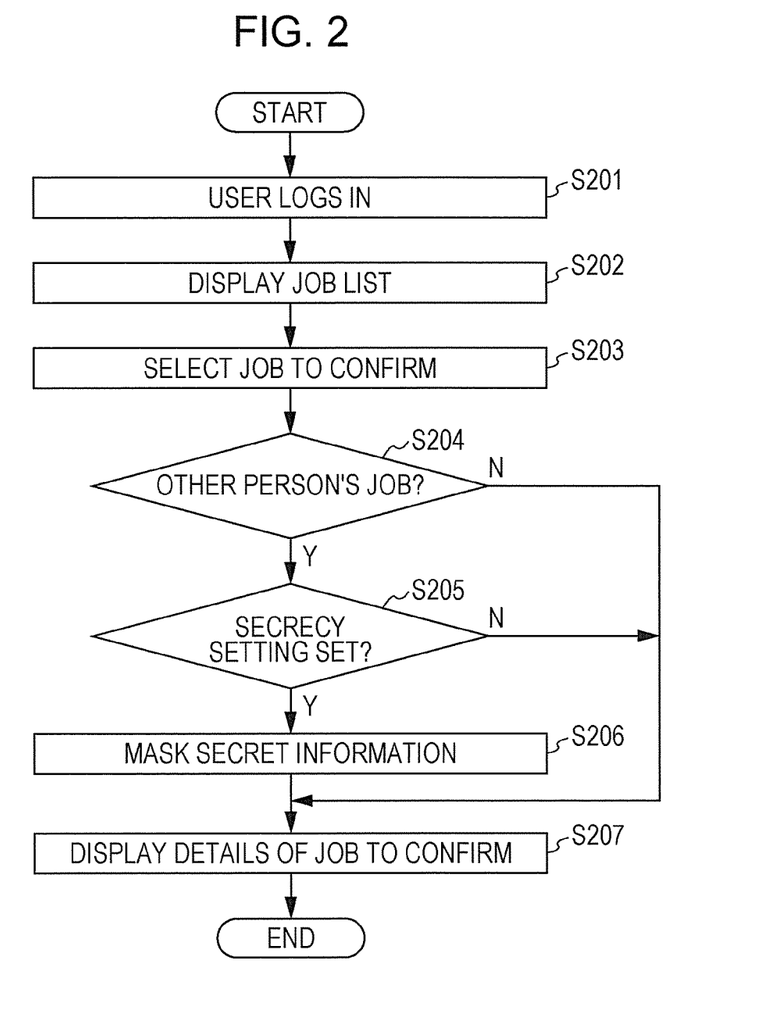
FIG. 2 is a diagram illustrating a specific example of a job information display process by the information processing apparatus.

FIG. 2 is a diagram (flowchart) illustrating a specific example of a job information display process by the information processing apparatus 100. The display process of the specific example illustrated in FIG. 2 may be executed to confirm job information related to a job processed by the information processing apparatus 100, for example.

In the specific example illustrated in FIG. 2, first, a user logs in to the information processing apparatus 100 (S201). For example, if a user identifier and a password or the like input from the user match a preregistered user identifier and password, the login of the user into the information processing apparatus 100 is granted. Note that the user may log in to the information processing apparatus 100 by operating the operation reception unit 40 for example, or log into the information processing apparatus 100 from a user apparatus (such as a personal computer, a tablet, or a mobile phone) connected to the information processing apparatus 100 through a communication channel or the like.

Next, the job list is displayed (S202). For example, if the user who has logged in to the information processing apparatus 100 in S201 (the login user) operates the operation reception unit 40 to issue an instruction to display a job list, a display image illustrating the job list managed by the job information management unit 20 is displayed on the display unit 80. Also, in the case in which the user has logged in to the information processing apparatus 100 from a user apparatus, a display image illustrating the job list may also be displayed on a display device of the user apparatus.

Figure 3A:
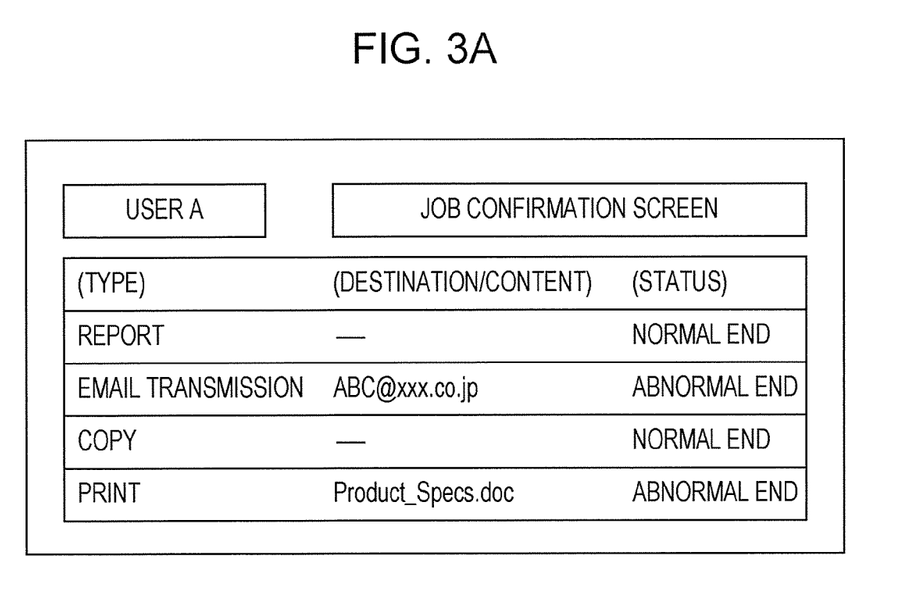
FIGS. 3A and 3B are diagrams illustrating specific examples of a display image illustrating a job list.
Figure 3B:
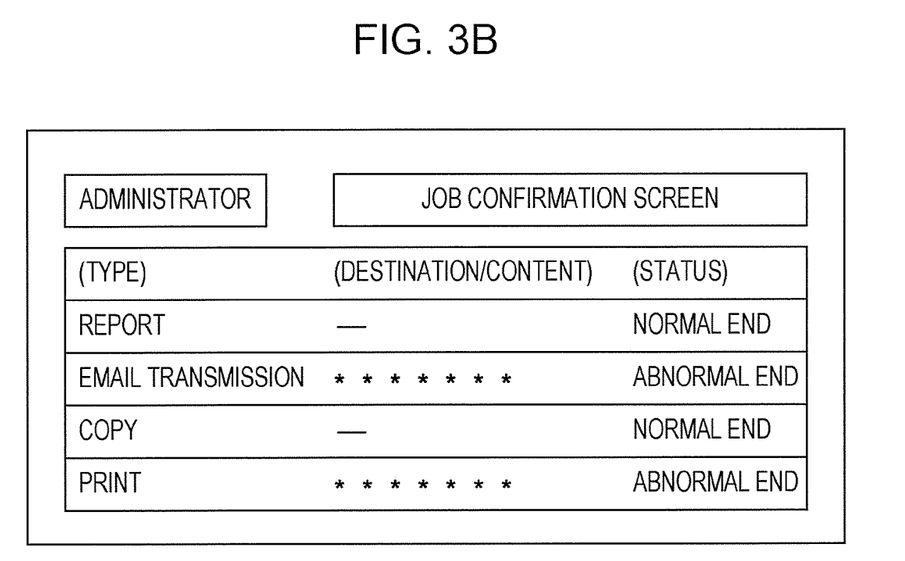

FIGS. 3A and 3B are diagrams illustrating specific examples of a display image illustrating a job list. FIGS. 3A and 3B illustrate specific examples of a display image illustrating a list of multiple jobs (report, email transmission, copy, print) used by a user A. Note that FIG. 3A is a specific example of a case in which the login user is the user A, while FIG. 3B is a specific example of a case in which the login user is the administrator of the information processing apparatus 100.

In the case in which the login user is the user A, as exemplified in FIG. 3A for example, the list of jobs used by the user A is displayed normally (without a masking process). In contrast, in the case in which the login user is the administrator, information marked secret by the user A may be displayed masked. For example, in the case in which the destination of the email transmission and the content of the print are marked secret, the destination email address of the email transmission and a file name indicating the content of the print may be masked like in the specific example illustrated in FIG. 3B.

Returning to FIG. 2, when the job list is displayed in S202, a job to confirm is selected (S203). For example, the login user selects a job whose job information the user wants to confirm (the "job to confirm" that is targeted for confirmation) from the job list displayed in S202.

Next, it is determined whether or not the job to confirm is another person's job (S204). For example, if the login user who has logged in in S201 is not the job owner of the job to confirm selected in S203, the job to confirm is determined to be another person's job. On the other hand, for example, if the login user who has logged in in S201 is the job owner of the job to confirm selected in S203, the job to confirm is determined not to be another person's job.

If the job to confirm is another person's job, it is determined whether the secrecy setting is present or absent (S205). For example, if information related to the job to confirm selected in S203 is marked secret (treated as secret information) in the secrecy setting managed by the job information management unit 20, the secrecy setting is determined to be present. On the other hand, if information related to the job to confirm selected in S203 is not marked secret, the secrecy setting is determined to be absent.

Subsequently, in the case in which the secrecy setting is present, the secret information is masked (S206), and the job information related to the job to confirm is displayed in detail (S207). Note that in the case in which the job to confirm is not another person's job according to the determination in S204, in other words, in the case in which the login user is the job owner of the job to confirm, and in the case in which the secrecy setting is absent with respect to the job to confirm according to the determination in S205, the job information related to the job to confirm is displayed in detail while being displayed normally without being masked (S207). When the job to confirm is displayed in detail, the flowchart exemplified in FIG. 2 ends.

Figure 4A:
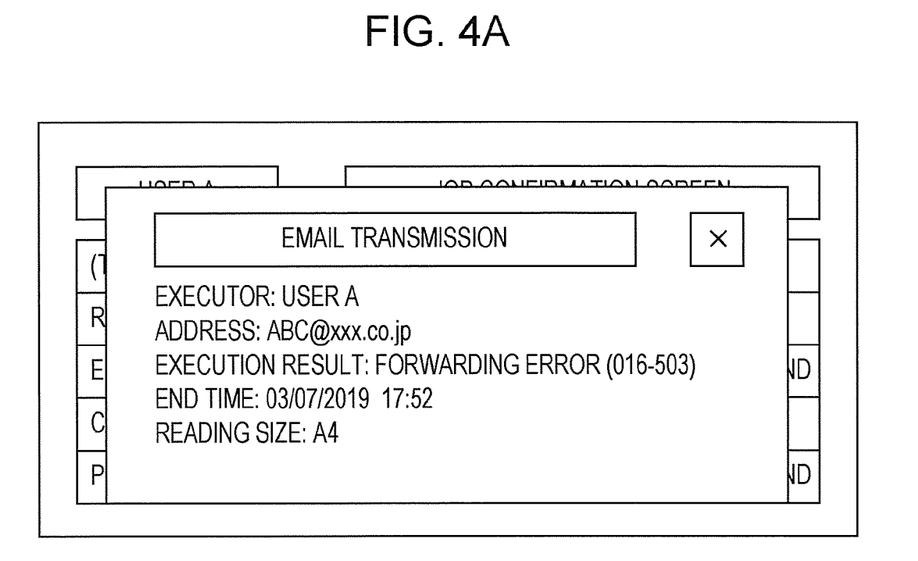
FIGS. 4A and 4B are diagrams illustrating specific examples of a detailed display of job information.
Figure 4B:
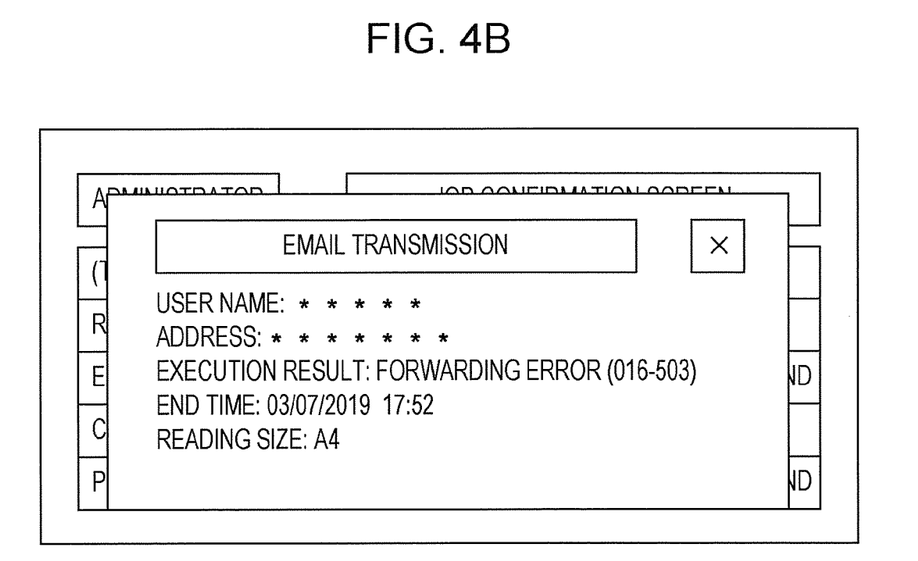

FIGS. 4A and 4B are diagrams illustrating specific examples of a detailed display of job information. FIGS. 4A and 4B exemplify a detailed display of job information related to the email transmission job used by the user A.

FIG. 4A is a specific example of the case in which the login user is the user A. For example, if the email transmission job is selected as the job to confirm from the job list exemplified in FIG. 3A, the detailed display exemplified in FIG. 4A is displayed.

In the specific example of FIG. 4A, because the login user is the user A who is the job owner of the job to confirm, the job information related to the email transmission that is the job to confirm is displayed in detail while being displayed normally without being masked, irrespectively of the presence or absence of the secrecy setting.

In contrast, FIG. 4B is a specific example of the case in which the login user is the administrator of the information processing apparatus 100. For example, if the email transmission job is selected as the job to confirm from the job list exemplified in FIG. 3B, the detailed display exemplified in FIG. 4B is displayed.

In the specific example of FIG. 4B, because the login user is an administrator who is not the job owner of the job to confirm, secret information is masked if the secrecy setting is present. For example, in the case in which the secrecy setting is set for the user name of the job owner and the destination of the email transmission, the user name and the destination are displayed masked, like in the specific example illustrated in FIG. 4B.

The job list exemplified in FIGS. 3A and 3B and the detailed display exemplified in FIGS. 4A and 3B may be displayed on the display unit 80 of the information processing apparatus 100 or may be displayed on a user apparatus (such as a personal computer, a tablet, or a mobile phone) of the login user. For example, in the case in which the login user has logged in to the information processing apparatus 100 from a user apparatus, image data of the display images exemplified in FIGS. 3 and 4 is transmitted to the user apparatus, and the display images are displayed on the user apparatus.

Note that in the case of transmitting the image data of display images for which the masking process is demanded as exemplified in FIGS. 3B and 4B to a user apparatus, for example, by performing the masking process on the information processing apparatus 100 before transmission, the safety of the secret information may be increased over the case of performing the masking process on the user apparatus after transmission.

Figure 5:
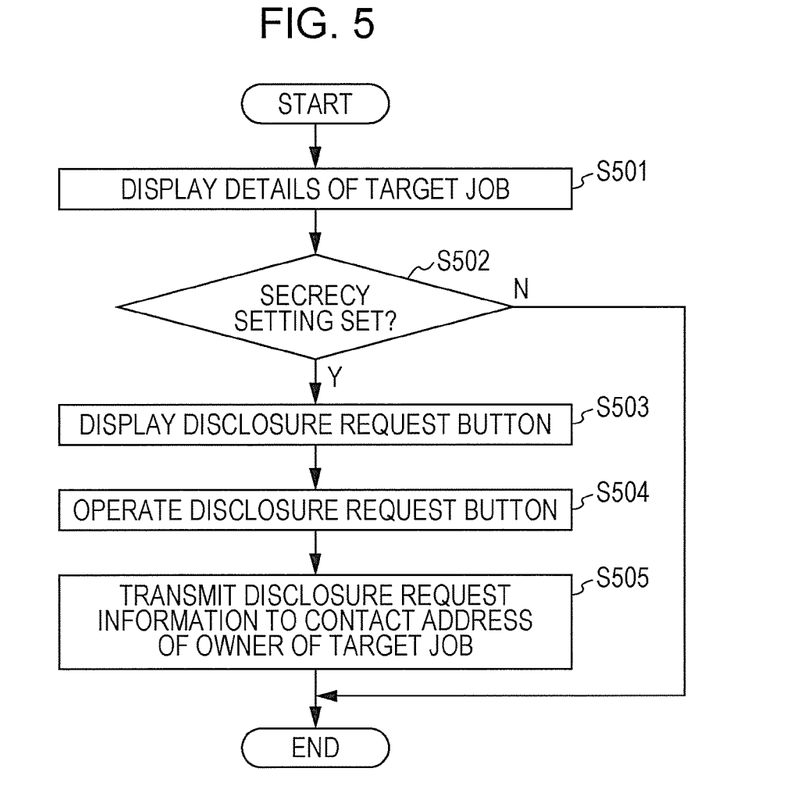
FIG. 5 is a diagram illustrating a specific example of a disclosure request by an administrator of the information processing apparatus.

FIG. 5 is a diagram (flowchart) illustrating a specific example of a disclosure request by the administrator of the information processing apparatus 100. For example, the administrator of the information processing apparatus 100 logs in to the information processing apparatus 100 with rights as the administrator, and after the administrator becomes the login user and executes the specific example of the display process exemplified in FIG. 2, the disclosure request process of the specific example illustrated in FIG. 5 may be executed. Note that execution of the disclosure request process illustrated in FIG. 5 may be restricted if the login user is not an administrator.

In the specific example illustrated in FIG. 5, first, job information related to a target job is displayed in detail (S501). For example, the administrator of the information processing apparatus 100 selects a target job that will become the target of the disclosure request as the job to confirm in the display process exemplified in FIG. 2. With this arrangement, job information related to the target job is displayed in detail.

Next, it is determined whether the secrecy setting is present or absent (S502). For example, if information related to the target job is marked secret (treated as secret information) in the secrecy setting managed by the job information management unit 20, the secrecy setting is determined to be present. On the other hand, if information related to the target job is not marked secret, the secrecy setting is determined to be absent, and the process exemplified in the flowchart of FIG. 5 ends.

In the case in which the secrecy setting is present, a disclosure request button is displayed (S503). In the case in which the secrecy setting is present, secret information is masked in the detailed display of the job information related to the target job in S501. The administrator of the information processing apparatus 100 uses the disclosure request button in cases such as when the administrator wants to know the content of the masked secret information to manage the information processing apparatus 100, for example.

Figure 6A:
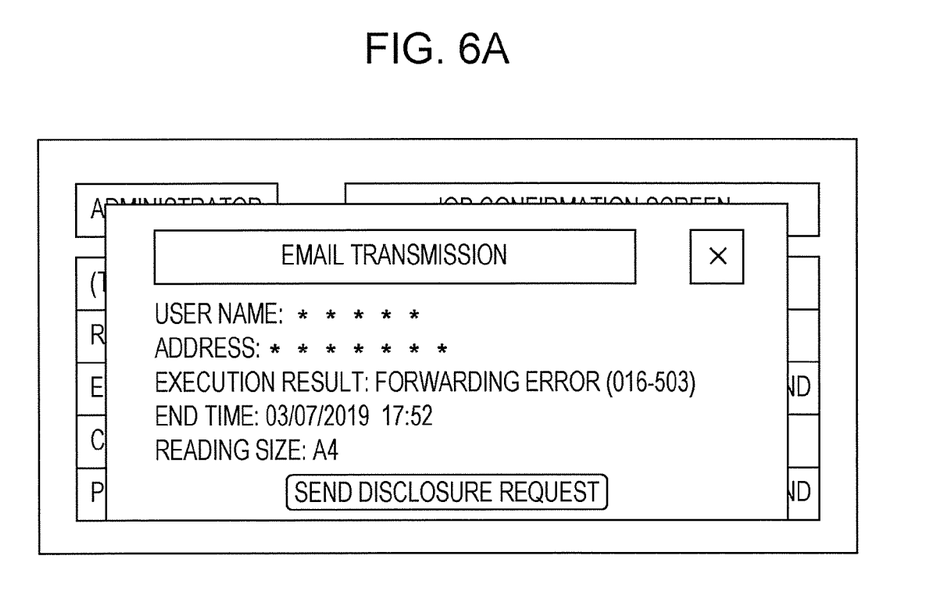
FIGS. 6A and 6B are diagrams illustrating specific examples of a disclosure request button.
Figure 6B:
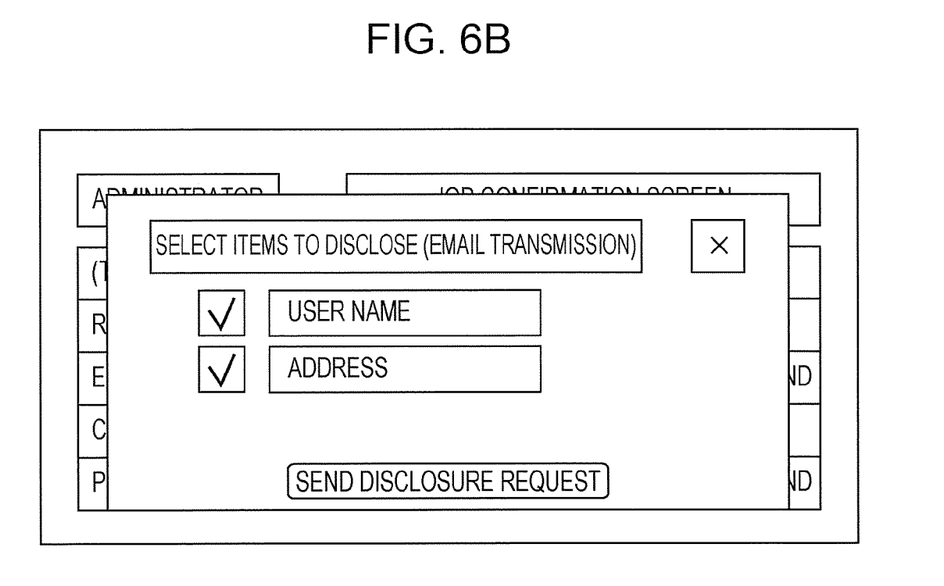

FIGS. 6A and 6B are diagrams illustrating specific examples of the disclosure request button. FIGS. 6A and 6B illustrate specific examples of displaying the disclosure request button in the detailed display exemplified in FIG. 4B. For example, in the case of wanting to know the content of masked secret information in the detailed display exemplified in FIG. 6A, the login user who is an administrator operates a "Send Disclosure Request" button displayed in the detailed display.

Additionally, the information processing apparatus 100 may also receive a disclosure request from an administrator for each item set as secret information among the multiple items included in the job information of the target job. For example, the display image exemplified in FIG. 6B may be displayed, and the login user who is an administrator may select items to disclose (by inputting checks into checkboxes, for example) from among the items set as secret information (for example, the user name and the destination) and then operate the "Send Disclosure Request" button, thereby causing a disclosure request to be realized with respect to the selected items.

Returning to FIG. 5, the administrator of the information processing apparatus 100 operates the disclosure request button in cases such as when the administrator wants to know the content of the masked secret information to manage the information processing apparatus 100, for example (S504).

When the disclosure request button is operated by the administrator, the information processing apparatus 100 transmits disclosure request information to the contact address of the job owner of the target job (S505). For example, the information processing apparatus 100 specifies the contact address of the user who is the job owner of the target job from among the contact addresses of multiple users included in the user information managed by the user information management unit 30. Subsequently, for example, the request transmission unit 50 transmits disclosure request information to the contact address of the job owner of the target job.

One specific example of disclosure request information transmitted to the contact address of the job owner is a disclosure request email transmitted to the email address of the job owner. The disclosure request email may also include a Uniform Resource Locator (URL) for canceling the secrecy setting of the target job managed by the job information management unit 20 of the information processing apparatus 100. In addition, the disclosure request email may also include a message such as "By operating the URL in this email, secret information about Job XXX (the job name of the target job) will be disclosed to the administrator" as the body of the email.

Additionally, for example, the job owner of the target job who has received the disclosure request email operates (by a click operation, for example) the URL included in the disclosure request email, thereby causing the information processing apparatus 100 that transmitted the disclosure request email to be specified by identification information such as an Internet Protocol (IP) address included in the URL, and the secrecy setting of the target job managed by the job information management unit 20 of the information processing apparatus 100 is canceled. With this arrangement, the canceled information is changed from a masked display to a normal display and disclosed to the administrator.

Note that the cancellation of the secrecy setting according to a response (for example, the operation of a URL) of disclosure permission by the job owner with respect to disclosure request information (for example, a disclosure request email) may be valid only for a predetermined fixed period for example, and after the fixed period, the secrecy setting may be reverted to an enabled state (concealed state).

Figure 7:
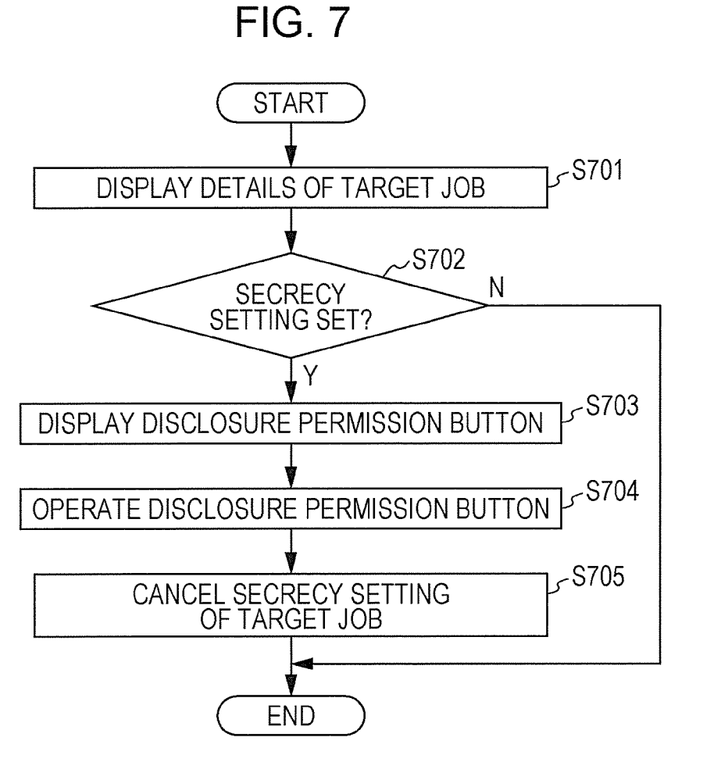
FIG. 7 is a diagram illustrating a specific example of a disclosure permission by a user of a target job.

FIG. 7 is a diagram (flowchart) illustrating a specific example of a disclosure permission by a user of a target job. For example, the job owner of the target job logs in to the information processing apparatus 100, and after the job owner becomes the login user and executes the specific example of the display process exemplified in FIG. 2, the disclosure permission process of the specific example illustrated in FIG. 7 may be executed. Note that execution of the disclosure permission process illustrated in FIG. 7 may be restricted if the login user is not the job owner.

In the specific example illustrated in FIG. 7, first, job information related to a target job is displayed in detail (S701). For example, the job owner of the target job selects a target job that will become the target of disclosure permission as the job to confirm in the display process exemplified in FIG. 2. With this arrangement, job information related to the target job is displayed in detail on the display unit 80 for example.

Next, it is determined whether the secrecy setting is present or absent (S702). For example, if information related to the target job is marked secret (treated as secret information) in the secrecy setting managed by the job information management unit 20, the secrecy setting is determined to be present. On the other hand, if information related to the target job is not marked secret, the secrecy setting is determined to be absent, and the process exemplified in the flowchart of FIG. 7 ends.

In the case in which the secrecy setting is present, a disclosure permission button is displayed (S703). In the case in which the secrecy setting is present, secret information is masked in the detailed display of the job information related to the target job to be displayed when the administrator logs in to the information processing apparatus 100, for example. The job owner uses the disclosure permission button in cases such as when the job owner wants to inform the administrator of the information processing apparatus 100 of the content of the masked secret information, for example.

Figure 8A:
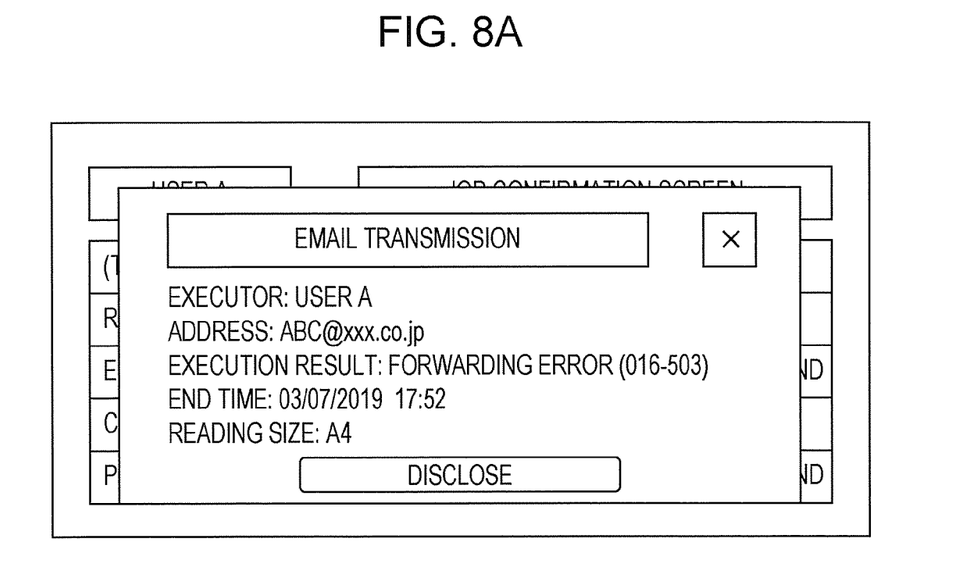
FIGS. 8A and 8B are diagrams illustrating specific examples of a disclosure permission button.
Figure 8B:
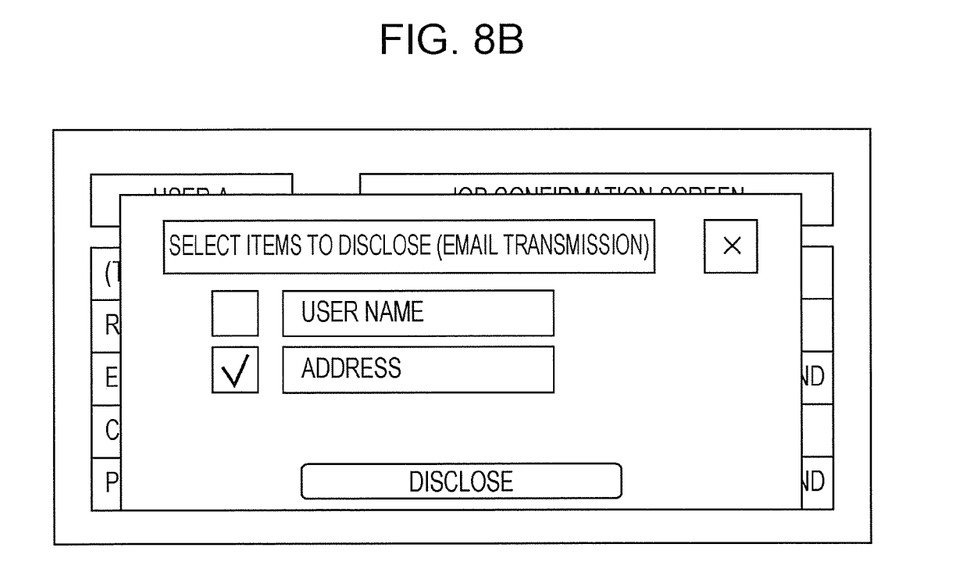

FIGS. 8A and 8B are diagrams illustrating specific examples of the disclosure permission button. FIGS. 8A and 8B illustrate specific examples of displaying the disclosure permission button in the detailed display exemplified in FIG. 4B. For example, in the case in which the user A who is the login user and the job owner wants to inform the administrator of the content of the secret information included in the detailed display exemplified in FIG. 8A, the user A operates a "Disclose" button displayed in the detailed display.

Additionally, the information processing apparatus 100 may also receive a disclosure permission from the user of the target job for each item having a disclosure request received from the administrator. For example, in the case in which a disclosure request has been received for the user name and the destination from the administrator using the display image exemplified in FIG. 6B, the display image exemplified in FIG. 8B may be displayed as the display image used by the user A who is the job owner, and the user A may select items to disclose (by inputting checks into checkboxes, for example) from among the items whose disclosure has been requested (for example, the user name and the destination) and then operates the "Disclose" button, thereby causing a disclosure permission to be realized with respect to the selected items.

Returning to FIG. 7, the job owner of the target job operates the disclosure permission button in cases such as when the job owner wants to inform the administrator of the content of the masked secret information to manage the information processing apparatus 100, for example (S704).

When the disclosure permission button is operated by the job owner of the target job, the information processing apparatus 100 cancels the secrecy setting of the target job (S705). For example, the secrecy setting of the target job managed by the job information management unit 20 is canceled, and the secret information displayed when the administrator logs in to the information processing apparatus 100 is changed from a masked display to a normal display and disclosed to the administrator.

Note that the cancellation of the secrecy setting by the disclosure permission button may be valid only for a predetermined fixed period for example, and after the fixed period, the secrecy setting may be reverted to an enabled state (concealed state). In addition, after the secrecy setting is canceled by the disclosure permission, the secrecy setting may also be reverted to an enabled state (concealed state) in the case in which a non-administrator user logs in to the information processing apparatus 100, for example. Also, in the case in which the secrecy setting is canceled, the job information management unit 20 may be configured to leave history information indicating that the secrecy setting was canceled, for example.

Also, in FIG. 7, a specific example is described in which the user of the target job who permits the disclosure of secret information is the job owner of the target job, but the user of the target job who permits the disclosure of secret information may also be an administrator or the like of an organization to which the job owner of the target job belongs.

The information processing apparatus 100 receives a disclosure request from an administrator related to secret information in a target job according to the specific example exemplified in FIG. 5 for example, and requests the user of the target job to disclose the secret information according to the specific example exemplified in FIG. 7 for example.

The information processing apparatus 100 may also be configured such that requesting the user of the target job to disclose secret information is limited to cases where it is determined that an error has occurred in the processing of the target job. For example, the information processing apparatus 100 may be configured to receive a disclosure request from the administrator related to secret information in a job whose execution result is an abnormal end (see FIGS. 3A and 3B), and not to receive a disclosure request from the administrator related to secret information in a job whose execution result is a normal end (see FIGS. 3A and 3B). With this arrangement, the disclosure of secret information may be restricted except in cases of investigating the cause of a malfunction.

In addition, the information processing apparatus 100 may display a job list containing one or more jobs for which an error is determined to have occurred, and receive the selection of a target job from the job list. For example, among the multiple jobs (report, email transmission, copy, print) exemplified in FIG. 3B, a job list indicating only the email transmission and the print that ended abnormally may be displayed, and the administrator may select the target job from the job list.

Also, for example, the information processing apparatus 100 may select one or more target jobs that satisfy a specified condition and receive a disclosure permission related to secret information in the selected one or more target jobs, or receive a disclosure request related to secret information in the selected one or more target jobs. Note that the condition specified for the disclosure permission and the condition specified for the disclosure request may be the same condition or different conditions.

Figure 9A:
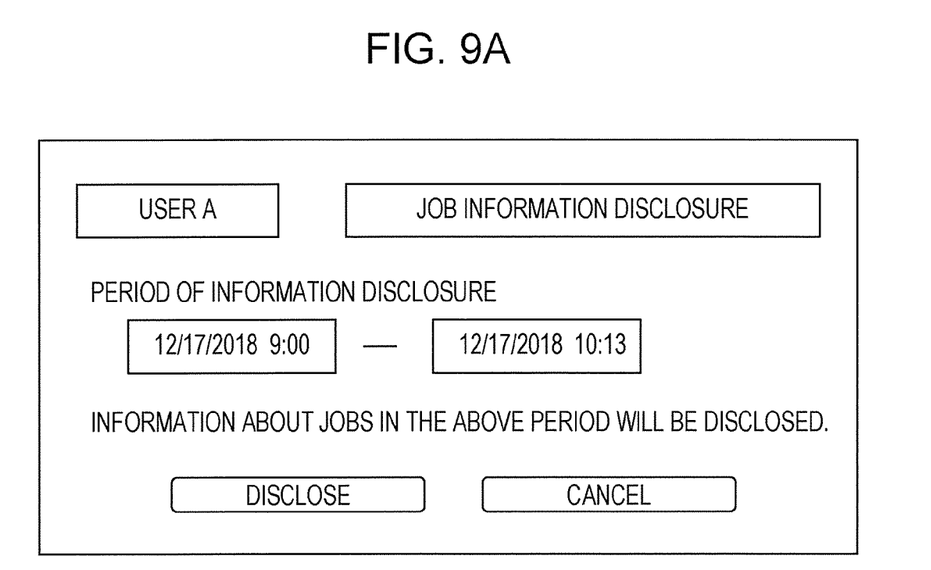
FIGS. 9A and 9B are diagrams illustrating specific examples of a disclosure permission and a disclosure request with respect to a target job that satisfies a specified condition.
Figure 9B:
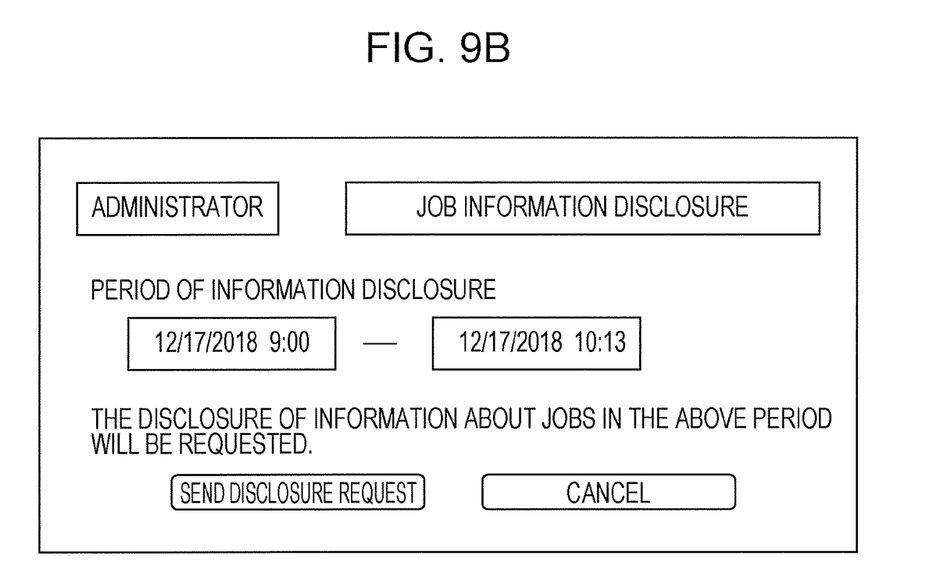

FIGS. 9A and 8B are diagrams illustrating specific examples of a disclosure permission and a disclosure request with respect to a target job that satisfies a specified condition. FIG. 9A illustrates a specific example of a display image in which one or more target jobs satisfying a condition (specified condition) specified by the user A who is the login user have been selected, and a disclosure permission related to secret information in the selected one or more target jobs is received from the user A.

In the specific example illustrated in FIG. 9A, a period of information disclosure is specified as the specified condition. With this arrangement, for example, one or more jobs executed by the information processing apparatus 100 during the specified period are selected as target jobs from among the multiple jobs executed according to instructions from the user A. In the case of wanting to inform the administrator of the content of secret information related to the selected one or more jobs, the user A operates a "Disclose" button on the display image exemplified in FIG. 9A. With this arrangement, for example, the secrecy setting related to one or more jobs of the user A executed during the specified period may be canceled collectively.

Also, FIG. 9B illustrates a specific example of a display image in which one or more target jobs satisfying a condition (specified condition) specified by the administrator who is the login user have been selected, and a disclosure request related to secret information in the selected one or more target jobs is received from the administrator.

In the specific example illustrated in FIG. 9B, a period of information disclosure is specified as the specified condition. With this arrangement, for example, one or more jobs executed during the specified period are selected as target jobs from among the multiple jobs executed by the information processing apparatus 100. In the case of wanting to know the content of secret information related to the selected one or more jobs, the administrator operates a "Send Disclosure Request" button on the display image exemplified in FIG. 9B. With this arrangement, for example, the secrecy setting related to one or more jobs by one or more users executed during the specified period may be canceled collectively.

Note that in the specific examples exemplified in FIGS. 9A and 9B, the jobs targeted by the disclosure permission may be limited to jobs for which an error is determined to have occurred, and the jobs targeted by the disclosure request may be limited to jobs for which an error is determined to have occurred.

Figure 10:
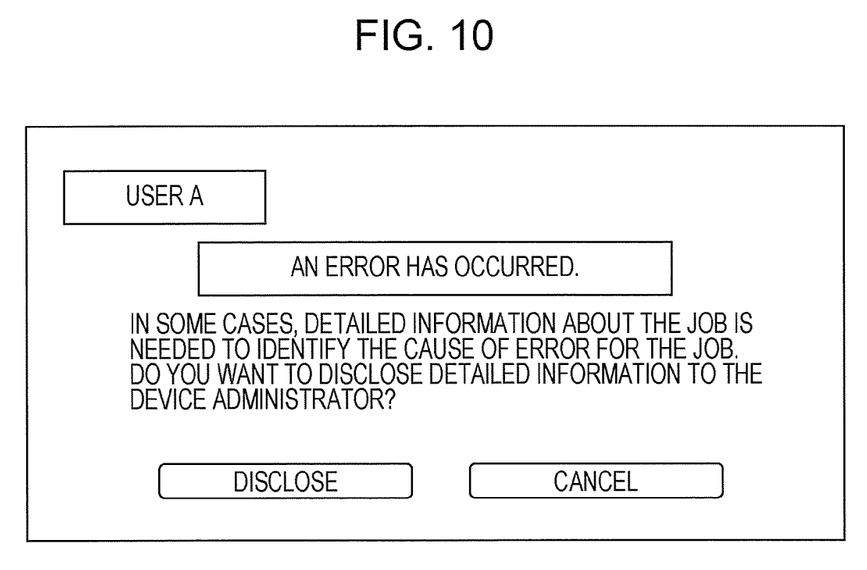
FIG. 10 is a diagram illustrating a specific example of a display image indicating that an error has occurred due to the execution of a job.

FIG. 10 is a diagram illustrating a specific example of a display image indicating that an error has occurred due to the execution of a job. For example, the display image exemplified in FIG. 10 is displayed when some kind of error occurs in a job that the user A who is the login user has caused the information processing apparatus 100 to execute, and the execution result is an abnormal end.

In the case of wanting to inform the administrator of the content of secret information related to the job for which an error is determined to have occurred, the user A operates a "Disclose" button on the display image exemplified in FIG. 10. With this arrangement, for example, the secrecy setting may be canceled immediately after it is determined that an error has occurred. Note that in the case in which the user A operates a "Do Not Disclose" button on the display image exemplified in FIG. 10, the secrecy setting is not canceled. Obviously, if after operating the "Do Not Disclose" button the user A permits the disclosure of secret information, the secrecy setting of the secret information may be canceled.

In addition, in the case of informing the administrator of the content of secret information related to a job for which an error is determined to have occurred, permission to disclose may be granted for each item forming the secret information, for example. Additionally, the information processing apparatus 100 may also select the items of secret information targeted by the disclosure permission according to the type of error that occurred or the like. For example, the information processing apparatus 100 may manage a list associating items of secret information targeted by the disclosure permission for each type of error, and by referencing the list, the items of secret information targeted by the disclosure permission may be selected according to the type of error. Furthermore, a display image indicating the items selected by the information processing apparatus 100 may be displayed, and the user of the target job may be prompted to confirm whether or not to permit the disclosure of the items.

The foregoing describes a specific exemplary embodiment of the present disclosure, but the specific examples described above are merely examples in all respects, and do not limit the scope of the present disclosure. The present disclosure encompasses various modifications within a scope that does not depart from the gist of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus managed by an administrator and used by a plurality of users, comprising:
   a display device; and
   a processor coupled to the display device and configured to:
      control the display device to display a plurality of jobs comprising multiple job types,
      receive a selection for a first target job from the plurality of jobs,
      control the display device to display the first target job comprising secret information which by default is unmasked for a user owning the first target job and masked for the administrator, wherein an execution of the first target job has resulted in an error,
      receive a disclosure request from the administrator for the secret information of the first target job among multiple jobs processed by the information processing apparatus in response to the execution of the first target job having resulted in the error, wherein the disclosure request which comprises multiple items associated with the secret information; and
      transmit to the administrator a selection of at least one of the multiple items as each of the multiple items disclose a different unmasked information of the secret information from the user of the first target job in response to the secret information having been requested by the administrator,
      transmit to the administrator a disclosure permission having a specific period for the secret information of the first target job from the user, and
      after receiving the disclosure permission, control the display device to display to the administrator the first target job without any masks to the unmasked information of the secret information in the first target job as long as the first target job is dated within the specific period and control the display device to display to the administrator a second target job for which the secret information is masked as the second target job is dated outside of the specific period, wherein the first target job and the second target job are owned by the same owner.

2. The information processing apparatus according to claim 1, wherein the processor is further configured to transmit the disclosure request to a contact address of the user of the target job obtained from user information that includes contact addresses of the plurality of users so as to obtain the disclosure permission from the user.

3. The information processing apparatus according to claim 2, wherein the processor is configured to cancel a secrecy setting of at least one item of the multiple items of the secret information according to the disclosure permission in response to the transmitted disclosure request.

4. The information processing apparatus according to claim 1, wherein the processor is configured to transmit the disclosure request to the administrator comprising: transmit the disclosure request to the administrator for each of the multiple items included in the first target job.

5. The information processing apparatus according to claim 2, wherein the processor is configured to receive the disclosure permission from the user comprising: receive the disclosure permission from the user of the first target job for each item of the multiple items.

6. A non-transitory computer readable medium storing a program causing a computer managed by an administrator and used by a plurality of users to execute a process for processing information, the process comprising:
  controlling the display device to display a plurality of jobs comprising multiple job types;
  receiving a selection for a first target job from the plurality of jobs;
  controlling the display device to display the first target job comprising secret information which by default is unmasked for a user owning the first target job and masked for the administrator, wherein an execution of the first target job has resulted in an error;
  receiving a disclosure request from the administrator for the secret information of the first target job among multiple jobs processed by the computer in response to the execution of the first target job having resulted in the error, wherein the disclosure request comprises multiple items associated with the secret information;
  transmitting to the administrator a selection of at least one of the multiple items as each of the multiple items disclose a different unmasked information of the secret information from the user of the first target job;
  transmitting to the administrator a disclosure permission having a specific period for the secret information of the first target job from the user; and
  after receiving the disclosure permission, controlling the display device to display to the administrator the first target job without any masks to the unmasked information of secret information in the first target job as long as the first target job is dated within the specific period and control the display device to display to the administrator a second target job for which the secret information is masked as the second target job is dated outside of the specific period, wherein the first target job and the second target job are owned by the same owner.

7. An information processing apparatus managed by an administrator and used by a plurality of users, comprising:
  a display device; and
  a processor coupled to the display device and configured to:
    control the display device to display a plurality of jobs comprising multiple job types,
    receive a selection for a first target job from the plurality of jobs,
    control the display device to display the first target job comprising secret information which by default is unmasked for a user owning the first target job and masked for the administrator, wherein an execution of the first target job has resulted in an error,
    receive a disclosure request from the administrator for the secret information of the first target job among multiple jobs, wherein the disclosure request comprises multiple items associated with the secret information in response to the execution of the first target job having resulted in the error,
    request a disclosure of the secret information from the user owning the first target job in response to the secret information having been requested by the administrator,
    receive a disclosure permission having a selection of at least one of the multiple items as each of the multiple items disclose a different unmasked information of the secret information and having a specific period from the user owning the first target job for the secret information of the target job, and
    after receiving the disclosure permission, control the display device to display to the administrator the first target job without any masks to the the unmasked information of secret information in the first target job as long as the first target job is dated within the specific period and control the display device to display to the administrator a second target job for which the secret information is masked as the second target job is dated outside of the specific period, wherein the first target job and the second target job are owned by the same owner.

8. The information processing apparatus of claim 1, wherein the processor is further configured to:
  control the display device to display in a menu multiple categories of the secret information associated with the disclosure request from the administrator, wherein the multiple categories comprises a first category and a second category,
  receive a selection of the first category in the received disclosure permission, and
  display the first target job without any masks to the first category in the secret information.

9. The information processing apparatus of claim 8, wherein the processor is further configured to:
  not receive a selection of the second category in the received disclosure permission, and
  display the first target job with masks to the second category in the secret information.

10. The information processing apparatus of claim 8, wherein each of the first category and the second category is associated with a different way to contact the user in response to the error in the first target job.

* * * * *